Patented Sept. 11, 1934

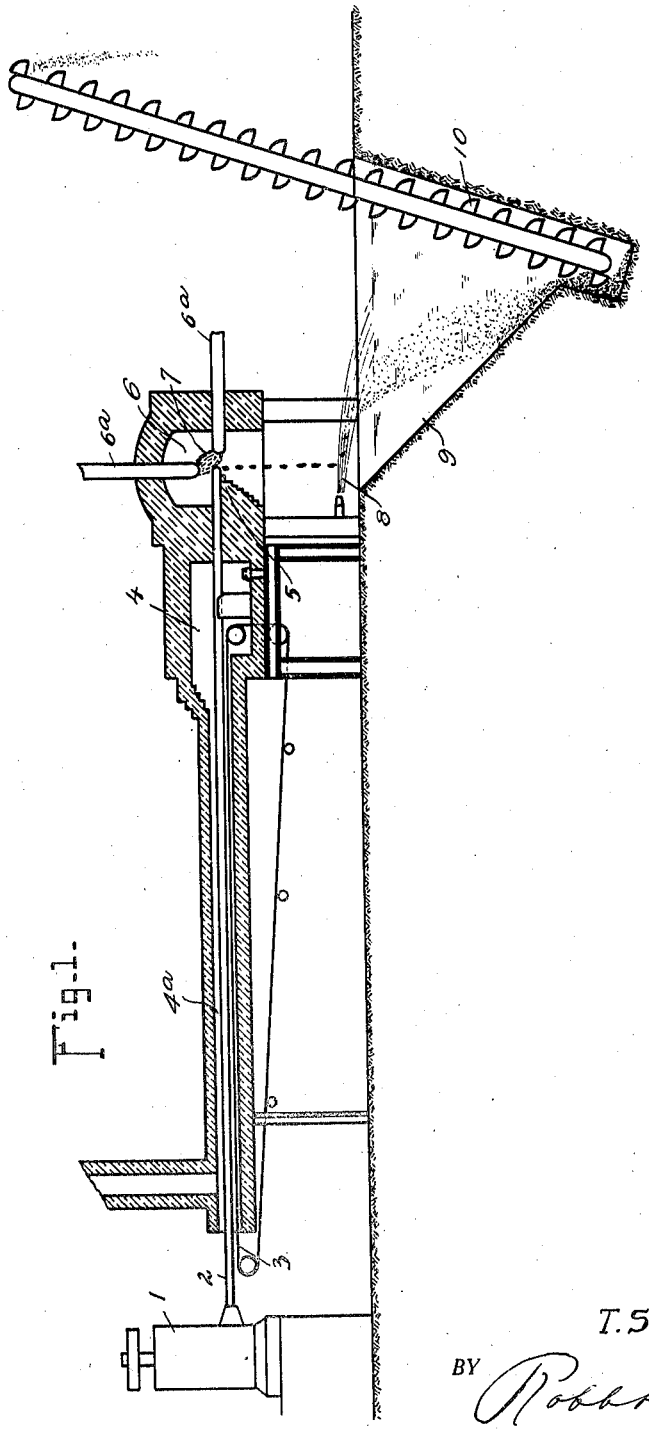

1,973,408

UNITED STATES PATENT OFFICE 1,973,408

PROCESS OF MAKING A FUSED AMORPHOUS CERAMIC COMPOSITION

Thomas S. Curtis, Huntington Park, Calif., assignor to Vitrefrax Corporation, Huntington Park, Calif.

Application July 30, 1928, Serial No. 296,404

8 Claims. (Cl. 49—77)

(For the manufacture of amorphous ceramic compositions.)

Heretofore, in the manufacture of ceramic compositions of matter of easily-crystallizable constitution, it has been the practice to heat the natural mineral, or synthetic mixture, of the desired composition to a temperature at which the oxides are reduced to a state of fluidity that promotes sufficient chemical reaction to permit the eutectic compound to form as a crystallized mass on cooling. This heat treatment may be of such a nature as to effect complete solution of the raw charge, as in the electric furnace melting of aluminum-silicate batches, for example, or the heat treatment may be carried out to merely that point necessary for a reaction in the pasty state, followed by the usual cooling cycle.

In either case, the end product, in the case of the mineral mullite, for illustration, is a crystallized mass in the interstices of which will be found a ceramic glass of a composition depending upon the (1) rate of cooling, (2) the percentage and nature of the fluxes present in the raw charge, and (3) the nature of the atmosphere in which the melt was conducted. Likewise, the orientation, size, and to some extent the shape of the crystals will be dependent upon the same influences.

Such crystallized eutectic compositions of matter are known to have valuable properties as refractory materials and as the aggregates in ceramic compositions, but at the same time, the crystallized compounds present certain difficulties and uncertainties in use. Among these objectionable features may be cited the difficulty with which a recrystallization of the matrix may be effected at temperatures within the limits of economical ceramic manufacturing practice.

It has been found by the inventor, that if the original composition, in the fused state, be made in the form of an amorphous material, i. e., having essentially no crystallization after it has cooled, the product may be used in ground form in a ceramic body with outstanding advantages over the same composition in pre-crystallized form. Chief among these advantages is the ease with which a complete and homogeneous recrystallization in the bonding matrix may be effected in the subsequent firing of the article at temperatures well within the range of practical ceramic manufacturing practice.

Since all silicate compositions which lean toward the eutectic between alumina and silica are very easily crystallized into mullite, or mullite and glass, the problem of retaining such melts in an amorphous form is a difficult one. If the rate of cooling be extended to more than a comparatively few seconds in the molten mass, crystallization is certain to ensue. Again referring to the presence of carbon, as a solid solution in the melt, if the carbon content be present even in such a small degree as a few hundredths of one per cent., it is virtually impossible to cool the mass with sufficiently great rapidity to prevent crystallization, and even though the end product may consist of a mixture of amorphous and crystalline particles as produced, the amorphous portion has a tendency to crystallize on ageing if merely stored at room temperature. This devitrification takes place in some compositions within a few hours and in others after several weeks.

It has been found, however, that if the melt be made rapidly and out of actual physical contact with fixed carbon, even though it be in an atmosphere of carbon vapor, and if the melt as formed, is carried by gravity instantly out of the zone of high temperature, and cooled by sudden quenching in water, the end product will be a bead or globule of completely amorphous form, with excellent properties of stability that completely satisfy the requirements of an amorphous eutectic composition of matter as outlined in preceding paragraphs.

To successfully carry out the manufacture of such an improved ceramic composition on a commercial scale and at economical cost, necessitates a nice balance of heating and cooling conditions, with melting carried out at a definite and controllable rate.

Such a condition is realized in the electric torch furnace which will now be disclosed in detail.

The furnace consists essentially of a ninety-degree carbon arc in a chamber of relatively small volume as compared with the usual practice in electric melting furnaces. The vertical and horizontal electrodes are coupled together with a driving mechanism which ordinarily feeds both electrodes at a uniform but controllable rate, but at the same time permits a hand adjustment of either carbon to compensate for inequalities in the rate of consumption of the two.

The charge to be melted is fed in the form of a baked rod into the furnace chamber in line with, and opposite to, the horizontal electrode, the rate of feed being determined by the rate at which the rod of charge is melted. Both electrode feed and charge feed are automatically arranged to keep the length of arc constant and to keep the rod of charge constantly bathed in the arc. By suitable variable speed controls, the relationship may be kept constant for indefinite periods of time.

The molten material drips from the end of the rod through an open bottom of the furnace chamber, and into a powerful stream of water which is kept circulating from and back to the tank in which the punched globules of product fall.

The globules of product are picked up by a chain-bucket elevator and, due to the stored heat in them, are sufficiently dry to enter the grinding mill from the top of the elevator.

From this brief summary of the operation, will be gleaned the following advantages: The product is either completely amorphous, or substantially so, depending upon the thoroughness with which the relative operations are conducted; the entire time of melting is measured in seconds from raw charge to finished product which not only expedites a rapid turnover of capital invested in material in process, but provides a continuous flow of product 24 hours a day; the charge never comes in contact with solid or fixed carbon, and is bathed in carbon vapor for such a short time that there is no measurable absorption of carbon; the operation is highly efficient from a thermal standpoint; since a very large percentage of the heat generated by the arc flame may be absorbed by the incoming charge due to the excellent control possible in the operation; the laborious task of cooling, stripping, breaking, hand sorting, and crushing of very hard ingots of fused material is completely obviated since the product is ready for the final grinding thirty seconds after it is melted.

To sum up the cycle of operations, let us refer to the drawing in order that the progress of the raw material may be followed through each successive step. The mixture of raw material consists of approximately 50% of the charge in finely ground and plastic form to which is added approximately 50% of the same composition which has been previously calcined and crushed to approximately one-quarter inch and finer. This mixture is fed into the vertical pug mill (1) from any desired type of rough mixer such as a paddle mixer or horizontal pug mill. From the vertical pug mill (1) the charge is extruded in the form of a cylindrical bar 2 which is immediately caught upon a conveyor of the belt or chain type (3) which must be made of a refractory alloy of which nickel-chromium is a class.

The belt conveys the plastic bar into a drying chamber (4a) which is heated by exhaust gases from the baking chamber (4). As the bar slowly passes through the drying chamber its water is slowly expelled and the strength of the bar is increased progressively during this transition, until the bar enters the baking chamber (4) where it is fired to a temperature sufficiently high to cause incipient vitrification. At this stage the bar will have become sufficiently firm to withstand sliding over a refractory hearth (5) and into the electric arc chamber (6) which it enters at red or yellow heat as desired. This preheating by means of cheap fuel enormously reduces the amount of electric current required for the subsequent melting of the charge.

As the bar passes into the flame of the electric arc (7) struck between carbon electrode 6a disposed at substantially right angles to each other it is instantly melted, the molten material falling in large drops through the open bottom of the furnace and into a powerful jet of water (8) which shatters and instantly freezes the molten product into a true glass or amorphous form of the chemical composition originally represented by the raw material batch.

The frozen drops or globules are forcibly thrown into the tank (9) from the boot of which they are continuously picked up by the elevator (10) which delivers them to storage or directly to the grinding mill. Throughout this specification and the appended claims, the term "amorphous" is taken in its true meaning, that is a substance in the form of a solid liquid or a glass resulting from cooling the melted substance so quickly that a crystalline growth thereof is prevented.

Having thus described my invention, what I claim as new and desire to secure by Letters Patent of the United States, is:—

1. The process of making amorphous mullite which comprises, melting mullite to cause the same to assume a liquid non-crystalline form and instantaneously cooling the melted mullite to retain the same in its amorphous form.

2. The process of making amorphous mullite which comprises, mixing the ground crystalline mullite with a sufficient quantity of water to make a pasty mass, extruding the mass in the form of a bar, conveying the formed bar thru a preheater to drive the water therefrom and partially vitrify the same so that it will retain its extruded form, fusing the end of the bar as it is conveyed to a high temperature chamber, and substantially simultaneously with the fusion, instantaneously super-cooling the fused mullite to render the same in its amorphous form.

3. The process of making an amorphous substance which comprises, mixing the ground substance with a sufficient quantity of water to make a pasty mass, extruding the mass in the form of a bar, conveying the formed bar thru a preheater to drive the water therefrom and partially vitrify the same so that it will retain its extruded form, fusing the end of the bar, as it is conveyed to a high temperature chamber, allowing the fused substance to drop off the bar as the fusion thereof takes place, and immediately directing a high pressure stream of cold liquid against the fused drops to simultaneously shatter and instantaneously super-cool the same to render the shattered drops in their amorphous form, and to prevent tendency thereof to subsequently recrystallize.

4. The process of preparing ceramic materials in amorphous form, adapted for use in the production of high strength vitreous ceramic articles, which comprises heat treating mullite to fuse the same and to render it amorphous, and substantially simultaneously with the fusion instantaneously super-cooling the resulting fused mullite to prevent tendency of the resulting amorphous fused mullite to recrystallize.

5. The process of preparing ceramic materials in amorphous form, which lies in heating mullite above the fusion point thereof, and substantially simultaneously with the fusion instantaneously super-cooling the fused mullite so quickly as to maintain the same in an amorphous form.

6. The process of preparing mullite in amorphous form, which comprises shaping mullite into a form which may be readily handled, simultaneously conveying and heating the said form to substantially increase the strength thereof, then subjecting the form to the action of an electric arc to cause liquefication with attendant conversion of the mullite into an amorphous state, and substantially instantaneously with the melting, super-cooling the molten liquified amorphous mullite to maintain the same in amorphous form without inherent tendency thereof to recrystallize and devitrify.

7. The process of preparing amorphous mullite which comprises heating crystalline mullite to a temperature above the fusion point thereof to produce liquefication of the mullite and its conversion into amorphous condition, substantially immediately super-cooling the molten mullite to maintain the same in its amorphous condition, completely dissipating the latent heat of the super-cooled mullite by continuously removing the super-cooled mullite to prevent subsequent tendency of the super-cooled amorphous material to recrystallize.

8. The process of preparing a ceramic material in amorphous form, which consists of gradually preheating a bar of ceramic composition to a red or white heat for production of incipient vitrification thereof, melting the said bar, and substantially simultaneously with the melting shattering and substantially instantaneously super-cooling the resultant molten material to cause it to assume its amorphous form without tendency to subsequently recrystallize.

THOMAS S. CURTIS.